US006979932B2

(12) United States Patent
Hamann et al.

(10) Patent No.: US 6,979,932 B2
(45) Date of Patent: Dec. 27, 2005

(54) PRODUCTION MACHINE

(75) Inventors: Jens Hamann, Fürth (DE); Uwe Ladra, Erlangen (DE); Elmar Schäfers, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 4 days.

(21) Appl. No.: 10/478,952

(22) PCT Filed: May 17, 2002

(86) PCT No.: PCT/DE02/01782

§ 371 (c)(1), (2), (4) Date: Dec. 1, 2003

(87) PCT Pub. No.: WO02/098603

PCT Pub. Date: Dec. 12, 2002

(65) Prior Publication Data

US 2004/0150291 A1 Aug. 5, 2004

(30) Foreign Application Priority Data

Jun. 1, 2001 (DE) ................................ 101 26 848

(51) Int. Cl.⁷ ............................................. H01L 41/08
(52) U.S. Cl. ...................... 310/311; 318/321; 318/328; 318/316.01
(58) Field of Search .................. 310/328, 311, 323.13, 310/323.21, 316.01, 321; 33/503, 645

(56) References Cited

U.S. PATENT DOCUMENTS

| 4,471,257 A | * | 9/1984 | Kleinschmidt ............... 310/328 |
| 4,593,658 A | * | 6/1986 | Moloney .................. 123/90.11 |
| 4,742,261 A | * | 5/1988 | Rich et al. ................... 310/328 |
| 5,043,621 A | * | 8/1991 | Culp ...................... 310/316.02 |
| 5,327,061 A | * | 7/1994 | Gullapalli .................... 318/649 |
| 5,909,939 A | * | 6/1999 | Fugmann ..................... 33/503 |
| 5,960,672 A | * | 10/1999 | Pritschow et al. ........ 74/490.07 |
| 6,402,444 B1 | * | 6/2002 | Wang et al. ................. 409/235 |
| 6,671,975 B2 | * | 1/2004 | Hennessey .................... 33/645 |

FOREIGN PATENT DOCUMENTS

| CN | 1 246 400 A | 3/2000 |
| DE | 197 03 735 A1 | 8/1998 |
| DE | 199 04 702 A1 | 8/2000 |
| DE | 100 33 074 A | 10/2001 |
| JP | 11 090867 A | 4/1999 |
| WO | WO 99/28095 A | 6/1999 |

* cited by examiner

Primary Examiner—Mark Budd
(74) Attorney, Agent, or Firm—Henry M. Feiereisen

(57) ABSTRACT

Parallel kinematics with rod guidance are nowadays used in machine tools, production machines and robotics. Changes in rod length caused by the special position of the moving work platform (P), by its acceleration and other force impact, can lead to positional errors. Such errors are eliminated by means of piezo-actuators (PA1–PA6) which are integrated into the rods (S1 to S6).

9 Claims, 2 Drawing Sheets

PRODUCTION MACHINE

BACKGROUND OF THE INVENTION

The invention relates to machine tools or manufacturing machines or robots, by which a unit can be positioned in space through the use of a parallel kinematic assembly having force transfer rods adapted to be driven along travel axes.

The use of rods that serve both as force transfer in moving a platform, and as support for the platform, is typical of the principle of parallel kinematics. A tripod is customarily used, for example, as is described in detail in connection with FIG. 1. In one such tripod, two rods are respectively disposed parallel to each other. The ends of each pair of rods are connected to a respective slider. All sliders are moved in the direction of the x-axis by a respective, appropriately disposed linear motor or a servomotor that operates linearly (rack and pinion). Consequently, a total of three motors can move the three sliders with their respective two parallel rods, by transporting the slides along a single common travel axis. The motors are driven in such a manner that the platform, with the respective assigned tool, moves in the desired three-dimensional workspace without the platform tipping.

However, it has already become evident that angular deviations of the platform from its working position can occur simply because of force vectors. In this situation, different forces must be provided in the movement of the individual rods to produce different elongations. In considering the order of magnitude of the position errors it becomes evident that, without additional inputs to the platform, errors of plus or minus 100 $\mu$m are possible.

Up to now, a compensation of these angular deviations was only possible through an adjustment of the length of the individual rods for a selected position in the workspace. Moving the platform out from that position modifies the distribution of forces in the rods and, therewith, also the elongation to be compensated. Because the angular deviation of the platform is different for all working positions, the structure permits establish only one optimal position to be definitively by the adjustment of the rods' lengths. On the other hand other positions in the work area are also indirectly influenced thereby, which can work out to be negative or positive. At present, one such optimization process is carried out manually, at great expense, to produce the intended platform position in the optimal manner in a process cycle.

Yet, as well as the static error, it is also computed with dynamic and load errors, however, whereupon it is then entered.

SUMMARY OF THE INVENTION

It is an object of the invention to develop a production machine of the aforementioned type so that optimal values can be produced for the whole processing area through an optimized rod-length correction.

In accordance with the invention, this object is achieved by providing a linear actuator element for at least one of the rods so that its axis of movement corresponds to the axis of the respective rod.

Using a piezo-electric actuator as the actuator element, guarantees a technically definite arrangement that is simple to implement.

In the simplest case, the static corrected desired rod-length value assigned for a corresponding position of the unit can be supplied in this way to the respective actuator without being controlled for acceleration and load interaction. But, on the other hand, such other disturbance variables can also be compensated by supplying a dynamic corrected desired rod-length value corresponding to the acceleration of the unit to the actuator or supplying to the actuator a corrected desired value corresponding to a load interaction in the unit.

The number of degrees of freedom that are possible in the movement depends on the parallel kinematics that are employed. Consequently, according to another advantageous embodiment of the invention, a linear actuator is provided in so many rods that the rods, with the help of some or all axes of movement, control all available degrees of freedom. Thus, for example, it is conceivable that the six possible degrees of freedom could be controlled with three drivers and three actuators in a respective one rod of the pairs of rods in the tripod. Obviously the individual motors must effect not only the basic movement function, but also corrective movements therewith.

In this way, by supplying the force or length condition determinable by force or length measurement of the corresponding rod to the respective actuator for the correction of the lengths of the rods, the existing effective condition in the system can actually be set, and it must not depart from the intended desired conditions.

In this connection, it is also advantageous for a respective piezo-sensor to be provided as the respective rod-length or rod-force pickups, because such sensors have performed extremely reliably. If, however, both the actuator as well as the sensor operate according the piezo-electric principle, it is conceivable for the respective piezo-actuators be substituted in the measurement stage as piezo-sensors to determine rod length or rod force. It thus provides a material-saving double use.

However, it is also possible to substitute strain-measuring strips as reliable, inexpensive sensors.

BRIEF DESCRIPTION OF THE DRAWING

An example of an embodiment of the invention is shown in the drawing and described in further detail below. The drawing shows in.

DETAILED DESCRIPTION OF PREFERRED EMBODIMENTS

Figure 1:
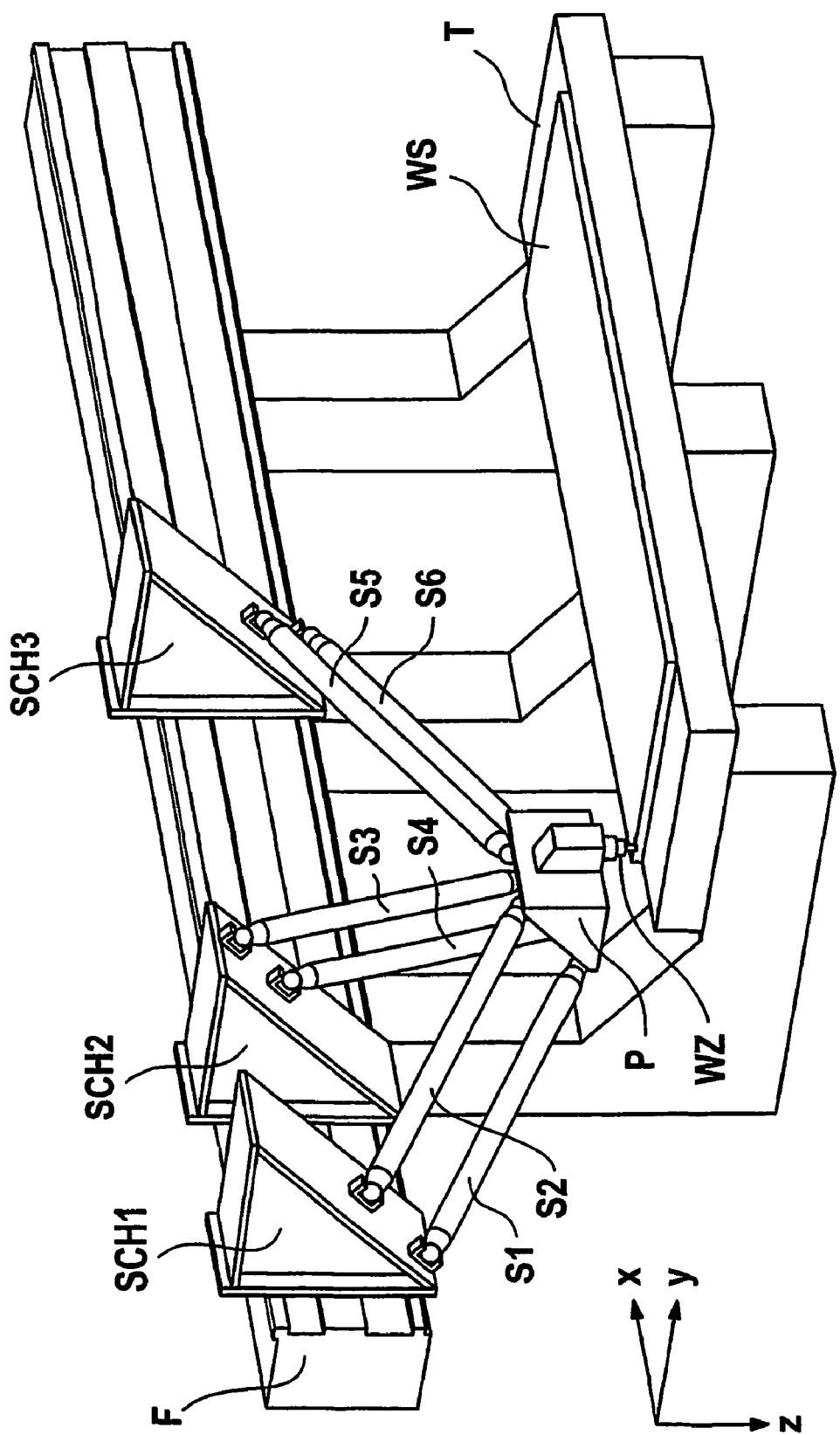
FIG. 1 a schematic perspective diagram of the unit.

The diagram in FIG. 1 shows a tripod having three pairs of rods consisting of rods R1 and R2, or R3 and R4, or R5 and R6. Rods S1 and S2 are attached to slide SCH1 and the platform P. Rods S3 and S4 are attached to slide SCH2 and also to the platform P. Rods S5 and S6 are connected to slide SCH3 and also to the platform P. The platform in the example provided is the carriage for a tool WZ used to machine a work piece WS that is located on a table T.

The slides SCH1, SCH2, SCH3 move along on a guide F in the x-axis direction. In the diagram, the corresponding driver is hidden. If all three slides SCH1, SCH2 and SCH3 are operated without moving relative to each other, they make a basic movement along the x-axis. In the event that drive orthogonal thereto is to be provided, on the y-axis or the z-axis relative to the work piece WS, the slides SCH1 to SCH3 must be moved relative to each other. This much describes the state-of-the-art tripod.

Figure 2:
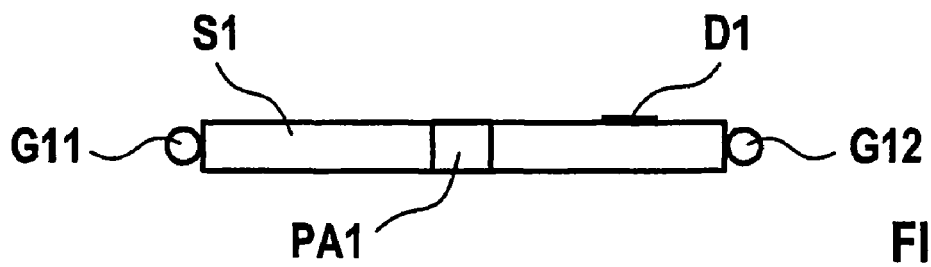
FIG. 2 a schematic diagram of a rod shown in FIG. 1.

For the present invention, essentially, a piezo-electric actuator is now provided on the rods S1 to S6 for rod-length compensation. This piezo-actuator is designated PA1 for the rod S1 shown in the diagram in FIG. 2. At either end of the rod S1 a link G11 or G12 is also symbolically indicated in this diagram and, furthermore, a strain strip D1 for detecting lengthening or force in rod S1 is indicated by a horizontal line. Corresponding piezo-actuators PA2 to PA6 can be provided for the rods S2 to S6. The same is true for the strips that measure length and strain.

Figure 3:
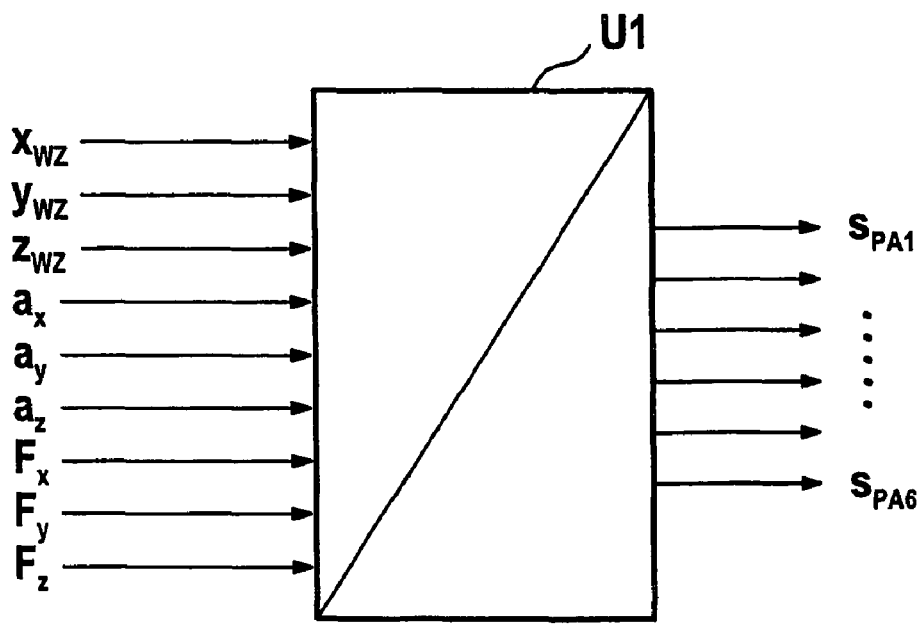
FIG. 3 a schematic diagram of a first processor embodiment.

In the diagram in FIG. 3 shows that, in principle, three values input to a processor U1 can generate rod-length correction signals for all possible piezo-actuators. The rod-length correction signals that are to be supplied to the piezo-actuators PA1 to PA6 of rods S1 to S6 are designated as $S_{PA1}$ to $S_{PA6}$. For static compensation, the desired positions of the tool WZ determined by the operating program are provided as Cartesian coordinates $x_{WZ}$, $y_{WZ}$, and $z_{WZ}$. The processor can carry out static compensation that is dependent on the values of these coordinates.

For example, the compensation values can be made available through computation or in the form of a tabular arrangement of preselected measurements.

In addition, it is possible to prevent dynamic errors produced by the acceleration of the tool along the axes X, Y and Z, that is, by the acceleration values $a_x$, $a_y$ and $a_z$. This makes dynamic compensation possible. Also, in the same manner, a compensation corresponding to the force applied to the tool is possible, that is, the Cartesian force vectors $F_x$, $F_y$ and $F_z$. In the processor U1 the correction values for the static, dynamic and force behavior can be superimposed and output as corresponding rod-length corrections $S_{PA1}$ to $S_{PA6}$ for rods S1 to S6.

Figure 4:
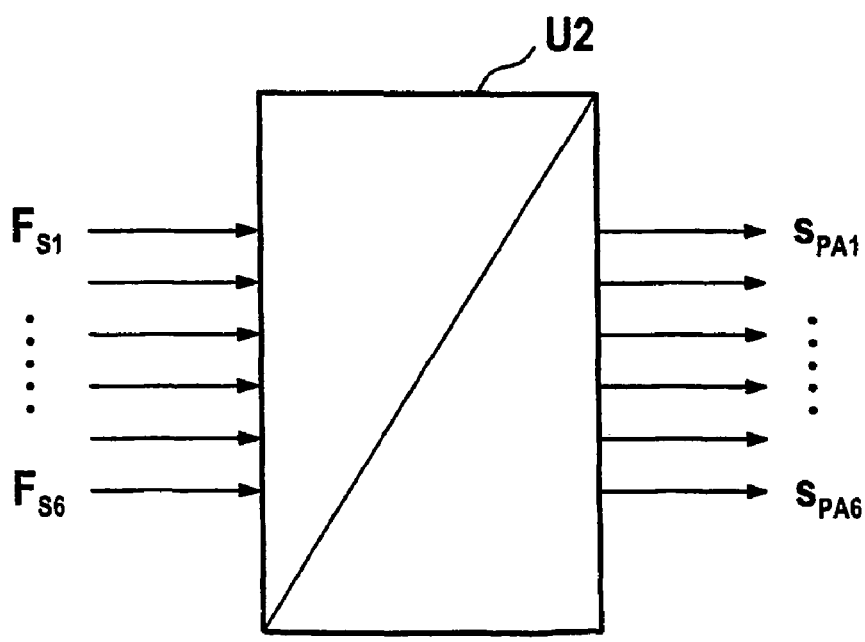
FIG. 4 a schematic diagram of a second processor embodiment.

However, when not just the information corresponding to the expected location and movement of the tool and the forces supposed to be applied to the tool by the proposed operation, but the actual values are supplied, then the result is another variant in accordance with the invention. The real forces within the rods or the resulting elongation that is connected with it is supplied to a processor U2, as shown in FIG. 4. Thus, the statement of the respective force in the rod, that is, the forces $F_{S1}$ to $F_{S6}$ in rods S1 to S6, also serve as input values for the processor U2. On the other hand, the rod-length correction values $S_{PA1}$ to $S_{PA6}$ are produced as output values. The force in the rods S1 to S6 can be determined by strain-sensor strips, such as those represented symbolically in FIG. 2 by one of the strain-sensor strips D1, however it is also possible for the force to be detected by the piezo-actuators PA1 to PA6. A loop having an extremely short measurement interval in it would be conceivable for the combined movement process, or measurement cycles that can be more widely separated, if force is detected in a more conventional manner.

What is claimed is:

1. A production machine having a kinematic assembly adapted to position a unit in space, said kinematic assembly including force-transfer rods, said force-transfer rods being adapted to be driven along a travel axis, said production machine comprising:
   a piezo-electric actuator in at least one of the rods, said piezo-electric actuator having an axis of movement corresponding to the axis of the respective rod;
   a rod measurement value provided by said piezo-electric actuator during a measurement phase, said measurement phase occurring during a movement of the unit; and
   correction means for using a desired value corresponding to said rod measurement value and said rod measurement value to supply a corrected desired value to said piezo-electric actuator for rod-length correction.

2. The production machine of claim 1, wherein said rod measurement value is a rod-length measurement value.

3. The production machine of claim 1, wherein said rod measurement value is a rod-force measurement value.

4. The production machine of claim 1, wherein a respective corrected desired value associated with a corresponding position of the unit is supplied to the actuator for static rod-length correction.

5. The production machine of claim 1, wherein a respective corrected desired value associated with a corresponding acceleration of the unit is supplied to the actuator for dynamic rod-length correction.

6. The production machine of claim 1, wherein a respective corrected desired value associated with a corresponding load interaction with the unit is supplied to the actuator for load-dependent rod-length correction.

7. The production machine of claim 1, wherein a plurality of rods are provided with said piezoelectric actuators, so that all available degrees of freedom can be controlled with the help of the axis of movement of a piezoelectric actuator in at least one of the rods.

8. A machine tool having a kinematic assembly adapted to position a tool unit in space at spatial coordinates having respective desired values, said kinematic assembly including force-transfer rods, said force-transfer rods being adapted to be driven along a travel axis, said production machine comprising:
   a piezo-electric actuator in at least one of the rods, said piezo-electric actuator having an axis of movement corresponding to the axis of the respective rod;
   a rod measurement value provided by said piezo-electric actuator during a measurement phase, said measurement phase occurring during a movement of the unit; and
   correction means for using a desired value corresponding to said rod measurement value and said rod measurement value to supply a corrected desired value to said piezo-electric actuator for rod-length correction.

9. A robotic machine having a kinematic assembly adapted to position a unit in space at spatial coordinates having respective desired values, said kinematic assembly including force-transfer rods, said force-transfer rods being adapted to be driven along a travel axis, said production machine comprising:
   a piezo-electric actuator in at least one of the rods, said piezo-electric actuator having an axis of movement corresponding to the axis of the respective rod;
   a rod measurement value provided by said piezo-electric actuator during a measurement phase, said measurement phase occurring during a movement of the unit; and
   correction means for using a desired value corresponding to said rod measurement value and said rod measurement value to supply a corrected desired value to said piezo-electric actuator for rod-length correction.

* * * * *